United States Patent [19]

Stephens

[11] 3,865,923

[45] Feb. 11, 1975

[54] CATALYST

[75] Inventor: Ruth E. Stephens, Royal Oak, Mich.

[73] Assignee: Ethyl Corporation, Richmond, Va.

[22] Filed: Mar. 19, 1973

[21] Appl. No.: 342,786

[52] U.S. Cl............ 423/213.2, 423/213.7, 252/462, 252/471
[51] Int. Cl............................................. B01d 53/00
[58] Field of Search ...... 423/213.5, 213.7; 252/471, 252/462, 463

[56] References Cited
UNITED STATES PATENTS

| | | | |
|---|---|---|---|
| 1,345,323 | 6/1920 | Frazer et al. | 423/213.5 X |
| 2,025,140 | 12/1935 | Wenzel | 423/213.2 |
| 3,230,034 | 1/1966 | Stiles | 423/213.2 |
| 3,316,057 | 4/1967 | Howk et al. | 423/213.5 X |
| 3,433,581 | 3/1969 | Stephens et al. | 423/213.5 X |
| 3,699,683 | 10/1972 | Tourtellotte et al. | 423/213.5 X |
| 3,715,322 | 2/1973 | Kobayashi | 252/463 X |
| 3,780,126 | 12/1973 | Manning | 252/471 X |

FOREIGN PATENTS OR APPLICATIONS 2,119,702  11/1971  Germany

OTHER PUBLICATIONS

Voorhoeve et al., "Science" Vol. 177; July 1972; pp. 353–354
Libby: "Science" Vol. 171; Feb. 1971; pp. 499–500.

*Primary Examiner*—G. O. Peters
*Attorney, Agent, or Firm*—Donald L. Johnson; Robert A. Linn; Joseph D. Odenweller

[57] ABSTRACT

Disclosed herein is an exhaust gas catalyst consisting essentially of a first metal selected from copper, nickel and cobalt, a rare earth metal, and a third metal selected from manganese, vanadium, iron and chromium, all in an oxide form and on a suitable catalyst support. The preferred catalysts contain copper, lanthanum and manganese in an atom ratio of about 1:2:3. The catalysts are resistant to lead.

6 Claims, No Drawings

CATALYST

BACKGROUND

Exhaust gas catalysts containing copper are known. Such catalysts are disclosed in U.S. Pat. Nos. 3,224,981 and 3,374,183. Catalysts containing rare earth metals are also known, as shown by U.S. Pat. No. 3,433,581. Likewise, catalysts have been prepared which contain manganese, as shown by U.S. Pat. No. 3,207,704.

SUMMARY OF THE INVENTION

According to the present invention catalysts are provided which have good lead resistance and which are highly effective in purifying engine exhaust. These catalysts consist essentially of a first metal selected from copper, nickel or cobalt, a rare earth metal, and a third metal selected from manganese, vanadium, iron and chromium, all in an oxide form. Preferably, the atom ratio of the metals is such as to favor the formation of a Perovskite type crystal structure on the support surface.

DESCRIPTION OF THE PREFERRED EMBODIMENTS

A preferred embodiment of this invention is an exhaust gas catalyst consisting essentially of about 0.1–10 weight per cent of a first metal selected from the group consisting of copper, nickel and cobalt, 1–20 weight per cent of a rare earth metal, and 0.1–20 weight per cent of a third metal selected from the group consisting of manganese, chromium, iron and vanadium, all in an oxide form and on a suitable support.

A more preferred embodiment is the combination of copper, a rare earth metal and manganese in an oxide form on a suitable support. Preferably, the amount of each metal is adjusted such that the atom ratio of the sum of the first metal plus the rare earth metal to the third metal is about 1–3:1.

In a particularly preferred embodiment the atom ratio of the first metal to the rare earth metal to the third metal is about 0.8–1.2:1.7–2.3:2.5–3.5, and especially 1:2:3.

The useful supports include all those materials generally used as catalyst supports such as alumina, silica, silica-alumina, magnesia, silica-magnesia-alumina, zirconia, and the like. High surface forms of such supports are preferred such as the activated or transitional aluminas. The supports may be in the form of spheres, pellets, extrusions, or in the form of a monolithic structure such as the honeycomb structure disclosed in U.S. Pat. No. 3,444,925, or commercially available compressed mineral fiber monoliths (e.g., Fibril 90, Soc. Generale des Produits Refractaires). Another very good support is an alumina which is first coated or impregnated with a rare earth metal oxide or an alumina or silica-alumina coating containing a rare earth metal oxide such as is described in my application Ser. No. 317,831, filed Dec. 22, 1972, and in my application entitled "Catalysts," filed concurrently with this application.

The metals are conveniently applied to the support by impregnation with a solution or sol containing the desired constituents in a form which is thermally decomposable to an oxide form and in the proper ratio. For this use, the water-soluble nitrates and acetates are well suited such as copper nitrate, copper acetate, nickel nitrate, cobalt nitrate, chromium nitrate, iron nitrate, manganese nitrate, and the like.

The amount of first metal (viz., copper, nickel or cobalt) can vary over a wide range. Good results are obtained when the catalyst contains about 0.1–10 weight per cent of the metal in the form of an oxide based on the weight of the catalyst. Mixtures of these metals can be used.

The amount of rare earth metal can likewise vary over a wide range. Good results are obtained when the catalyst contains about 1–20 weight per cent of rare earth metal in an oxide form.

The catalyst contains about 0.1–20 weight per cent of the third metal (viz., manganese, chromium, iron and vanadium) in an oxide form. The most highly preferred metal of the third group is manganese.

In a highly preferred embodiment of the invention the relative amounts of each metal constituent of the catalyst is adjusted such that the atom ratio of the sum of the first metal and rare earth metal to the third metal is about 1–3:1. For example, the atom ratio of first metal (e.g., copper) to rare earth metal (e.g., lanthanum) to third metal (e.g., manganese) in this preferred embodiment can be 1:1–2:1–3. Excellent results are obtained when this ratio is about 1:1:1. In a still more preferred embodiment the atom ratio of the first metal (e.g., copper) to rare earth metal (e.g., lanthanum) to third metal (e.g., manganese) is about 0.8–1.2:1.7–2.3:2.5–3.5. Excellent results are obtained when this ratio is about 1:2:3.

In another highly preferred embodiment the atom ratio of first metal (e.g., copper) to rare earth metal (e.g., lanthanum) to third metal (e.g., manganese) is 0.2–1:0.8–1:1. In this embodiment it is preferred that the amount of first metal on an atom basis does not exceed the amount of rare earth metal.

It is believed that the reason the above preferred atom ratios give superior results is that the metal oxides form a Perovskite type crystal structure on the support surface. This structure has been detected by X-ray diffraction studies which show principal lines corresponding to about 2.7–2.8, 1.9–1.95, and 1.56–1.59 crystal dimensions, which are typical of Perovskite type structures.

After the support has been impregnated or coated with the aqueous solution of the desired metal salts it is dried and heated to decompose the metal compounds to an oxide form. This can be accomplished by known means such as by first air drying the catalyst and then slowly heating to about 600°C. Activation is improved by maintaining at about 600°C. for about an hour. Effectiveness of the final catalyst can be improved by washing it with dilute nitric acid and again drying and calcining the catalyst. If desired, low temperature activity may be improved by including a small amount of a noble metal such as palladium in the impregnation solution or by giving the catalyst a final impregnation with an aqueous palladium salt (e.g., palladium chloride) solution sufficient to provide about 0.005 to about 0.2 weight per cent palladium in the final catalyst.

The following examples show methods by which the catalysts can be prepared.

EXAMPLE 1

In an impregnating vessel was placed 251 g manganese nitrate hexahydrate (0.875 m), 253 g lanthanum nitrate hexahydrate (0.584 m), 70 g copper nitrate trihydrate (0.292 m), and sufficient water to make 750 ml of solution. After the salts were dissolved, one-half of the solution was poured into a vessel containing one quart (about 900 g) of alumina (Alcoa F-1). After impregnation was complete, residual water was evaporated using a hot air blow and the catalyst then heated to 600°C. The catalyst was cooled and impregnated a second time with the remaining solution, dried, and heated to 750°C., giving an effective catalyst of the present invention.

Other catalysts can be readily prepared by substituting equal mole amounts of nickel nitrate, cobalt nitrate, or mixtures thereof, for the cupric nitrate used in the above example. Likewise, the manganese nitrate can be replaced with equal mole amounts of a vanadium salt, ferric nitrate or chromic nitrate. In like manner, other rare earth metal nitrates can be used in place of lanthanum nitrate such as cerium nitrate, praseodymium nitrate, neodymium nitrate, and the like. An especially useful rare earth metal salt is "didymium" nitrate, which is a mixture of rare earth metal nitrates which analyzes, on an oxide basis, as 45-46 per cent lanthanum oxide, 9-10 per cent praseodymium oxide, 32-33 per cent neodymium oxide, 1-2 per cent cerium oxide, 5-6 per cent samarium oxide, 3-4 per cent gadolinium oxide, and 0-1 per cent other rare earth oxides. If desired, the mole ratio employed in the above example may be varied within broad ranges prescribed for the present catalysts.

EXAMPLE 2

In this example the alumina support was first precoated with a silica-alumina coating containing copper oxide and a mixture of rare earth metal oxides and then with copper-lanthanum-manganese oxide.

In an impregnating vessel was placed 300 g aluminum nitrate (1.4 m), 87 g didymium nitrate (0.2 m), 48 g cupric nitrate (0.20 m) and 12 g finely-divided silica powder. Water was added to make 700 ml, and after stirring, the mixture was poured into two quarts (about 1800 g) 5-8 mesh activated alumina. Residual water was evaporated with hot air and the alumina heated slowly to 600°C.

A second solution was prepared by mixing 48 g copper nitrate (0.20 m), 164 g lanthanum nitrate (0.38 m), 144 ml 50 per cent manganese nitrate (0.6 m) and sufficient water to make 325 ml of solution. This was stirred until dissolved and then poured over one quart of the above treated alumina. Residual water was evaporated with air blow while mixing and then dried and heated slowly to 600°C. After one-half hour at this temperature it was heated to 750°C. and held at this temperature for 1.5 hours. It was then allowed to cool, giving an effective catalyst.

EXAMPLE 3

In a mixing vessel was placed 90 ml 50 per cent manganese nitrate solution (0.375 m), 108 g lanthanum nitrate hydrate (0.25 m), 41.4 g nickel acetate hydrate (0.167 m), and sufficient water to dilute to 350 ml. The solution was poured over 1 quart activated alumina. Residual water was evaporated by hot air blow and the catalyst heated slowly to 750°C.

A second solution was prepared by mixing 41.4 g (0.5 acetate hydrate (0.167 m), 144.4 g lanthanum nitrate hydrate (0.33 m), 143.5 g manganese nitrate hydrate (0.5 m), and sufficient water to make 375 ml of solution. This was poured into the above catalyst and the resultant product again dried and heated to 750°C. After cooling, it was washed with hot dilute nitric acid and again dried, giving a very effective catalyst.

EXAMPLE 4

In an impregnating vessel was placed 210 ml 50 per cent manganese nitrate solution (0.875 m), 254 g didymium nitrate (0.584 m), 73 g cobalt acetate hydrate (0.293 m), and sufficient water to make 325 ml of solution. This was then poured into one quart of 5-8 mesh alumina and the product dried and heated to 600°C., giving an active catalyst.

EXAMPLE 5

In a vessel was placed 1 ml 1 M cobalt nitrate, 2 ml 1 M lanthanum nitrate and 3 ml 1 M chromic nitrate. This was poured into 10 ml activated silica-alumina (5 per cent silica) extruded support and, after drying, heated to 750°C., giving an active catalyst.

EXAMPLE 6

In a vessel was placed 1 ml 1 M cobalt nitrate, 2 ml 1 M lanthanum nitrate, and 3 ml 1 M chromic nitrate. This was poured into 10 ml of an extruded silica-alumina support, dried, and heated to 750°C., giving an active catalyst.

EXAMPLE 7

In a vessel was placed 1 ml 1 M cobalt nitrate, 2 ml 1 M lanthanum nitrate and 3 ml 1 M manganese nitrate. This was poured into 10 ml of extruded silica-alumina support, dried, and heated to 750°C.

EXAMPLE 8

In a vessel was placed 60.3 g copper nitrate hydrate (0.25 m), 71.8 g manganese nitrate hydrate (0.25 m), 79 g lanthanum acetate (0.25 m), and sufficient water to make 500 ml. The mixture was stirred and warmed to form a solution and then poured into 1 liter of 5-8 mesh activated alumina. After absorption was complete, residual water was dried with hot air blow and the product heated, first on a hotplate and then in an oven to 750°C. After one hour at 750°C., it was allowed to cool.

It will be readily apparent that the foregoing procedures can be used to prepare similar catalysts on any support. Likewise, the amounts of each ingredient can be widely varied within the parameters of this invention and substitutions of the previously listed metal compounds can be made.

Engine tests were carried out to demonstrate the high effectiveness and good lead resistance of the present catalysts. In these tests, a 36 CID single cylinder engine was operated and the exhaust gas passed through dual parallel 42 cubic inch catalytic converters. The engine was operated on a cycle at which it idled 50 seconds and ran at wide open throttle 150 seconds.

ENGINE OPERATING CONDITIONS

|  | Idle | WOT |
|---|---|---|
| Engine speed | 800 | 1340 |
| Exhaust CO (%) | 5 | 3 |
| Air added (SCFM) | 0 | 1 |

The gasoline used represented a typical commercial gasoline but contained 12 ml of tetraethyllead per gallon. This is many times the amount normally used in gasoline and was used to demonstrate the excellent compatibility of the present catalysts with leaded gasoline. The exhaust hydrocarbon and carbon monoxide was measured at WOT, both before and after the catalyst bed. The following tables show some of the results obtained.

CATALYST OF EXAMPLE 1

| Time (hrs.) | Percent Reduction | |
|---|---|---|
| | HC | CO |
| 2.1 | 85 | 95 |
| 25 | 75 | 88 |
| 50 | 68 | 83 |

CATALYST OF EXAMPLE 2

| Time (hrs.) | Percent Reduction | |
|---|---|---|
| | HC | CO |
| 1.7 | 90.0 | 96.1 |
| 24.5 | 84.7 | 93.3 |
| 48.8 | 78.4 | 92.7 |
| 70.6 | 72.4 | 90.7 |
| 96.8 | 70.4 | 85.0 |

CATALYST OF EXAMPLE 3

| Time (hrs.) | Percent Reduction | |
|---|---|---|
| | HC | CO |
| 0 | 68 | 92 |
| 21 | 66 | 90 |
| 45 | 68 | 87 |

From these results, it can be seen that the present invention provides effective exhaust gas catalysts that are resistant to the deactivating effect of lead. The catalysts can also be used as reducing catalysts in exhaust gas to lower the amount of nitrogen oxides by contacting the exhaust gas under reducing conditions (i.e., carbon monoxide content of about 2–10 per cent) with the present catalysts.

I claim:

1. A method of lowering the hydrocarbon and carbon monoxide content of engine exhaust gas under oxidizing conditions and the nitrogen oxides content of engine exhaust gas under reducing conditions comprising contacting said exhaust gas under said oxidizing or reducing conditions at engine exhaust temperature with an exhaust gas catalyst consisting essentially of a uniform metal oxide composition deposited on a catalyst support, said metal oxide composition consisting essentially of about 0.1–10 weight per cent of a first metal selected from the group consisting of copper, nickel and cobalt, 1–20 weight per cent of a rare earth metal, and 0.1–20 weight per cent of manganese, in an oxide form, said percentages based upon the total catalyst weight, the balance of said catalyst consisting of said catalyst support, the atom ratio of the sum of said first metal and said rare earth metal to manganese being 1–3:1, said metal oxide deposit having a Perovskite type crystal structure as shown by X-ray diffraction.

2. A method of claim 1 wherein said first metal is copper.

3. A method of claim 2 wherein said support is an alumina.

4. A method of claim 3 wherein said rare earth metal is lanthanum.

5. A method of claim 4 wherein the atom ratio of said copper to said lanthanum to said manganese is about 0.8–1.2:1.7–2.3:2.5–3.5.

6. A method of claim 5 wherein said ratio of copper to lanthanum to manganese is about 1:2:3.

* * * * *